United States Patent [19]
Rutschke

[11] 3,845,546
[45] Nov. 5, 1974

[54] TOOL CHANGE MECHANISM

[75] Inventor: Arno Rutschke, Zurich, Switzerland

[73] Assignee: Werkzeugmaschinenfabrik Oerlikon-Buhrle AG, Zurich, Switzerland

[22] Filed: Sept. 18, 1972

[21] Appl. No.: 289,800

[30] Foreign Application Priority Data
Oct. 1, 1971  Switzerland................ 14324/71

[52] U.S. Cl.................. 29/568, 279/1 TS, 294/116
[51] Int. Cl................................ B23q 3/00
[58] Field of Search........... 29/26 A, 588; 279/1 TS, 279/103; 294/116

[56] References Cited
UNITED STATES PATENTS

| | | | |
|---|---|---|---|
| 2,121,025 | 6/1938 | Egger................................ | 294/116 |
| 2,927,703 | 3/1960 | Rainey et al..................... | 29/568 X |
| 3,477,121 | 11/1969 | Martin................................ | 29/568 |
| 3,678,572 | 7/1972 | Mello et al........................ | 29/568 |

Primary Examiner—Andrew R. Juhasz
Assistant Examiner—Z. R. Bilinsky
Attorney, Agent, or Firm—Werner W. Kleeman

[57] ABSTRACT

A tool change mechanism comprising a tool holder and a clamp with arms for gripping same. The tool holder possesses a flange with three recesses at the periphery of the flange with which engage the arms of the clamp. The recesses are formed by grooves directed perpendicular to the axis of the tool holder, and each arm engages with two grooves of the flange.

8 Claims, 2 Drawing Figures

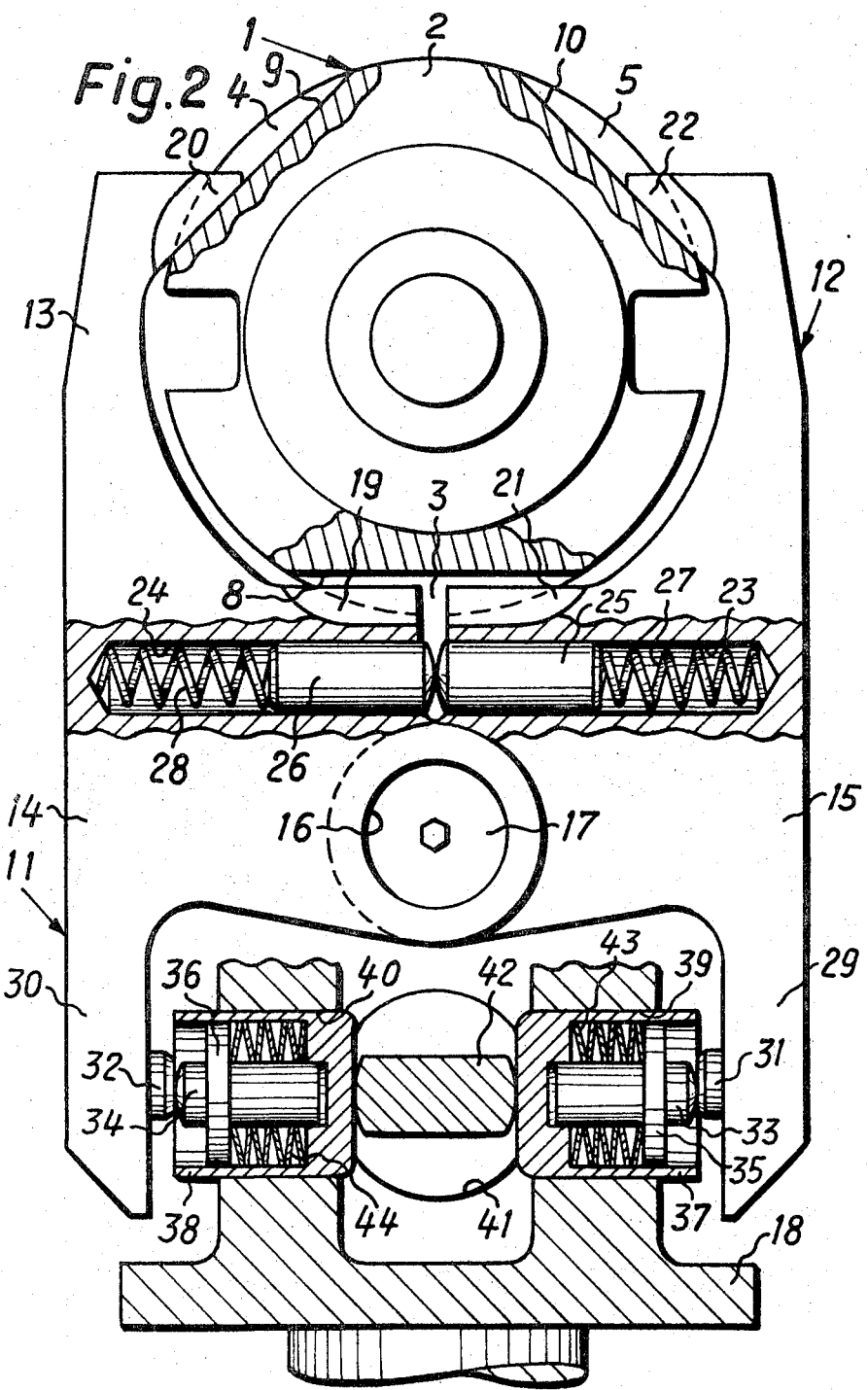

TOOL CHANGE MECHANISM

BACKGROUND OF THE INVENTION

The present invention relates to a new and improved construction of tool change or exchange mechanism with a tool holder and a clamp member or clamp having arms for gripping the tool holder, the tool holder possessing a flange having three recesses at the periphery of such flange with which engage the arms of the clamp.

A known tool change mechanism of this type employs standardized tool holders additionally provided at the periphery of their flange with three bores. Two bores are arranged neighboring and parallel to one another and come into engagement by means of two cams with an arm of a clamp member. Opposite both of the aforementioned bores there is arranged offset through 180° the third bore. During gripping of the tool holder by the clamp this third bore engages with a cam at the other clamp arm. The forward end of the cam is of conical-shape, so that an inherent radial centering of the tool holder during gripping by the clamp is possible to a limited extent. However, a disadvantage of this constructional arrangement is the fact that the tool holder must be relatively exactly aligned with respect to the clamp engaging therewith in order to be engaged by such clamp. Furthermore, the bores can become easily clogged by dirt or other foreign contaminants, so that there is prevented faultless intercooperation of the tool holder and clamp.

SUMMARY OF THE INVENTION

Hence, from what has been discussed above it will be recognized that this particular field of technology is still in need of a tool change mechanism which is not associated with the aforementioned drawbacks and limitations of the prior art constructions. Thus, it is a primary object of the present invention to provide a new and improved construction of tool change mechanism which effectively and reliably fulfills the existing need in the art and is not associated with the aforementioned drawbacks and limitations of the prior art proposals.

Another and more specific object of the present invention relates to an improved construction of tool change mechanism having considerably improved inherent radial centering of the tool holder at the clamp and possessing increased insensitivity to contamination.

Now in order to implement these and still further objects of the invention, which will become more readily apparent as the description proceeds, the invention contemplates forming the recesses as grooves directed substantially perpendicular to the axis of the tool holder, and each clamp arm engages in two grooves of the tool holder flange.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 illustrates a clamp with the tool holder clamped therein.

DETAILED DESCRIPTION OF THE PREFERRED EMBODIMENTS

Figure 1:
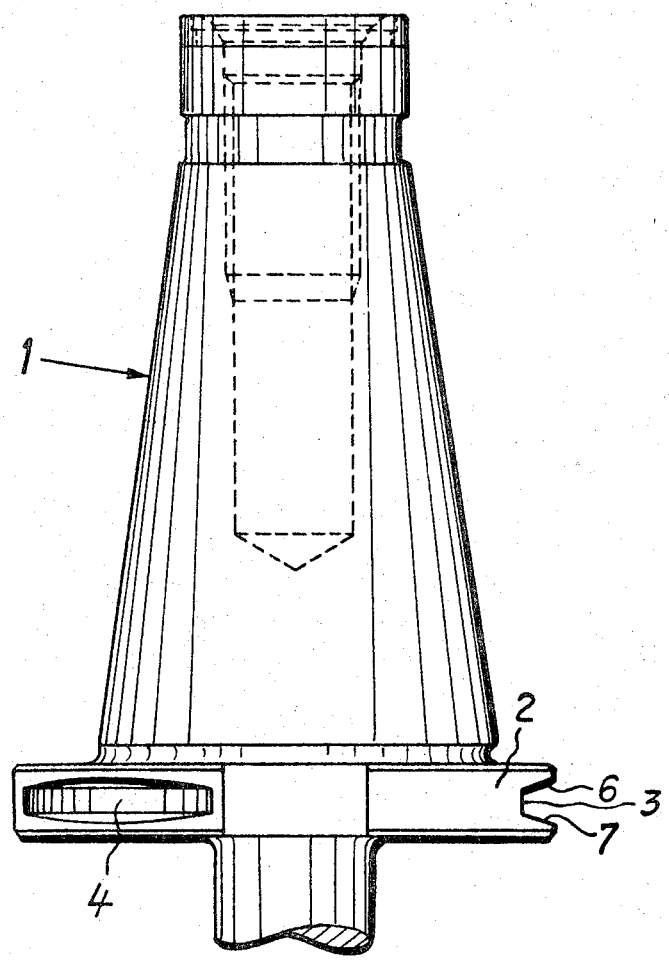
FIG. 1 schematically illustrates a standardized tool holder.

Describing now the drawings, in FIG. 1 there is illustrated a tool holder 1 which constitutes a standardized ISO-50 (International Organization for Standardization) tool cone 1a which therefore need only be considered with respect to its modifications or changes. These changes consist of the provision of three grooves 3, 4, and 5 cut or otherwise formed at the outer periphery of the cone flange 2 and directed perpendicular to the cone axis. The grooves 3, 4 and 5 respectively possess bevelled or inclined sidewalls 6, 7. According to the showing of FIG. 2, the respective base 8, 9 and 10 of the grooves 3, 4 and 5 respectively are located at the legs or sides of an equalsided i.e. isosceles triangle. Both grooves 4 and 5 are arranged at the periphery of the flange 2 offset 90° with regard to one another and the third groove 3 is arranged opposite both of the other grooves 4 and 5 and respectively offset therefrom through an angle of 135°.

A clamp or clamp means 11 possesses two gripper arms 12 and 13. These gripper arms 12 and 13 overlap by means of their rear parts 14 and 15. The rear parts 14 and 15 possess aligned bores 16. A bolt 17 is piercingly inserted through the bores 16 at both clamp parts 14 and 15 and is suitably mounted at a carrier or support 18 for the clamp 11. Each of both gripper arms 12 and 13 of the clamp 11, when the clamp is closed, engages about the flange 2 of the tool holder 1 along its periphery through an angle of 135°. The confronting inner jaws of the gripper arms 12 and 13 are of essentially circular construction — linear extending webs 19 to 22 are only formed at the locations opposite the grooves 3, 4 and 5 and which possess cross-sections corresponding to the cross-sections of the grooves 3, 4 and 5. The length of the webs 19 to 22 is shorter than one-half of the length of the respective grooves 3, 4 and 5 with which they engage. In this manner it is possible that both of the webs 19 and 21 located at different gripper arms 12, 13 simultaneously come into engagement with the groove 3. When the clamp 11 is closed the webs 19, 21 are perpendicular to the axis of symmetry of the clamp. Both of the remaining webs 20 and 22 only engage with one-half of the respective associated grooves 4 and 5 which possess the greater spacing from the axis of symmetry of the clamp 11. In this manner relatively small movements of the gripper arms 12 and 13 are sufficient in order to clamp and release the tool holder 1.

Two blind hole bores 23 and 24 which, when the clamp 11 is closed, are disposed perpendicular to its axis of symmetry and aligned with one another, are arranged from the inside at the gripper arms 12 and 13 respectively. The blind hole bores 23 and 24 are located forwardly of the point or axis of rotation of the clamp 11 formed by the pivot bolt 17. Bolts 25 and 26 are displaceably arranged at the blind hole bores 23 and 24 respectively, which bear through the agency of helical springs 27 and 28 respectively, at the base of the blind hole bores 23 and 24. The helical or coils springs 27 and 28 press both of the bolts 25 and 26 against one another and exert upon both gripper arms 12 and 13 a moment in the opening sense. As best seen by referring to FIG. 2, clamp portions 14, 15 possess rearwardly directed arms 29, 30 with inwardly directed cams or dogs 31, 32. The cams 31 and 32 bear against bolts 33 and 34 respectively, which bolts are guided by means of collars 35 and 36 at pot-shaped or cup-shaped sleeves 37 and 38 respectively. These pot-shaped sleeves 37 and 38 are displaceably mounted at bores 39 and 40 respectively, at the carrier or support 18. The axes of the bores 39 and 40 are directed perpendicular to the axis of symmetry of the clamp 11. A pin 42 or the like rotatably arranged in a bore 41 possesses over a portion of its axial lengthwise extent an approximately rectangular-shaped cross-section as shown. The bore 41 extends perpendicular to both bores 39, 40 and intersects such. In the illustrated embodiment the pot-shaped sleeves 37 and 38 bear by means of their respective base upon the associated narrow side or face 42a of the rectangular-shaped pin 42, so that movement of the pot-shaped sleeves 37 and 38 in the bores 39 and 40 respectively towards the inside is prevented and the clamp 11 remains closed. Owing to contact of the pot-shaped sleeves 37 and 38 with the narrow sides 42a of the pin 42 of rectangular-shape cross-section this pin 42 is secured against unitentional rotation. The bolts 33 and 34 are relatively displaceable with respect to the pot-shaped sleeves 37 and 38 in that their collars 35 and 36 bear through the agency of a package of plate or cup springs 43 and 44 at the floor or base of the pot-shaped sleeves 37 and 38. Owing to this relative displaceability there is rendered possible a certain tolerance compensation.

To open the clamp 11 the pin 42 is rotated through an angle of 90° in the bore 41, so that displacement of the pot-shaped sleeves 37 and 38 is possible until contacting with or bearing against the lengthwise sides 42b of the rectangular-shaped pin 42. This displacement occurs under the action of the opening force exerted by the helical springs 27 and 28 upon the gripper arms 12 and 13.

While there is shown and described present preferred embodiments of the invention, it is to be distinctly understood that the invention is not limited thereto but may be otherwise variously embodied and practiced with the scope of the following claims. ACCORDINGLY,

I claim:

1. A tool change mechanism comprising an axially extending tool holder, a clamp with arms for gripping the tool holder, said tool holder possessing a flange equipped with three recesses at its periphery, said recesses being formed by grooves lying in a plane substantially perpendicular to the axis of the tool holder, each arm engaging in two grooves of the flange, substantially linear extending webs at the inside of the arms, the length of said webs being smaller than one-half of the length of each of the grooves and the cross-section of said webs being accommodated to the cross-section of the grooves, a pivot bolt about which the arms of the clamp are pivotably arranged, aligned blind hole bores provided at the arms, bolts bearing against one another arranged in said aligned blind hole bores, spring means for loading said bolts, the clamp further possessing rearwardly directed arms with respect to the axis of rotation defined by said pivot bolt, bolts guided at substantially pot-shaped sleeves against which bear said rearwardly directed arms, a rotatable pin having a substantially rectangular-shaped cross-section against which bear said pot-shaped sleeves.

2. The tool change mechanism defined in claim 1, wherein the bolts guided at the pot-shaped sleeves possess collars bearing via a respective associated package of plate springs upon the floor of the associated pot-shaped sleeve.

3. The tool change mechanism defined in claim 1, wherein each of the grooves possess bevelled sidewalls.

4. An axially extending tool holder possessing a flange adapted to be supported by a tool gripper said flange being equipped with three recesses at its periphery, said recesses being formed by grooves lying in a plane substantially perpendicular to the axis of the tool holder, each groove having a base, and the bases of the grooves, when projected, intersect to form a triangle.

5. An axially extending tool holder possessing a flange adapted to be engaged by a tool gripper, said flange being equipped with three recesses at its periphery, said recesses being formed by grooves lying in a plane substantially perpendicular to the axis of the tool holder, each groove having a base and the bases of the grooves, when projected, intersecting to form an isosceles triangle and each groove possessing bevelled sidewalls.

6. A tool change mechanism including an axially extending tool holder, a clamp with at least two arms for gripping the tool holder, said tool holder possessing a flange transverse to the tool holder axis equipped with three recesses at its periphery, said recesses being formed by grooves lying in a plane substantially perpendicular to the axis of the tool holder, each groove having a base, the bases of the grooves each being located at a side of a triangle having two equal sides, two arms of the clamp engaging the same groove and each arm further engaging in two grooves of the flange lying on said equal sides of the triangle.

7. The tool change mechanism defined in claim 6, including substantially linear extending webs at the inside of the arms, the length of said webs being smaller than one-half at the length of each of the grooves, a pivot bolt about which the arms of the clamp are pivotably arranged, aligned blind hole bores provided at the arms, bolts bearing against one another arranged in said aligned blind hole bores, spring means for loading said bolts, said clamp further possesses rearwardly directed arms with respect to the axis of rotation defined by said pivot bolt, bolts guided at substantially pot-shaped sleeves against which bear said rearwardly directed arms, a rotatable pin having a substantially rectangular-shaped cross-section against which bear said pot-shaped sleeves.

8. The tool change mechanism defined in claim 7, wherein the bolts guided at the pot-shaped sleeves possess collars bearing via a respective associated package of plate springs upon the floor of the associated pot-shaped sleeve.

* * * * *